(12) United States Patent
Murad

(10) Patent No.: US 10,777,078 B1
(45) Date of Patent: Sep. 15, 2020

(54) SYSTEM AND METHOD TO ALERT A VEHICLE OCCUPANT TO RECOMMENCE VEHICLE OPERATIONS

(71) Applicant: GM GLOBAL TECHNOLOGY OPERATIONS LLC, Detroit, MI (US)

(72) Inventor: Mohannad Murad, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/734,699

(22) Filed: Jan. 6, 2020

(51) Int. Cl.
*G08G 1/0967* (2006.01)
*B60R 11/04* (2006.01)
*B60W 50/16* (2020.01)
*B60W 30/18* (2012.01)
*G06K 9/00* (2006.01)
*G06T 7/20* (2017.01)

(52) U.S. Cl.
CPC ............ *G08G 1/0967* (2013.01); *B60R 11/04* (2013.01); *B60W 30/18027* (2013.01); *B60W 50/16* (2013.01); *G06K 9/00228* (2013.01); *G06K 9/00825* (2013.01); *G06K 9/00845* (2013.01); *G06T 7/20* (2013.01); *G06K 2209/23* (2013.01); *G06T 2207/30236* (2013.01); *G06T 2207/30252* (2013.01)

(58) Field of Classification Search
CPC ...... B60W 40/09; B60W 40/06; B60W 40/04; G06Q 10/02; G06Q 50/30; G06Q 10/06315; G06Q 30/0207; G06Q 30/0217; G06Q 30/0236; G06Q 30/0645; G01C 21/3484; G01C 21/3438
USPC .. 340/438, 439, 457, 539.1, 539.22, 539.25, 340/901, 905, 907
See application file for complete search history.

(56) References Cited

U.S. PATENT DOCUMENTS 10,144,408 B2 * 12/2018 Theodosis .......... G06K 9/00845
2014/0222280 A1 * 8/2014 Salomonsson ......... B60Q 9/008 701/28
2017/0043715 A1 * 2/2017 Osugi .................... G06F 3/013

* cited by examiner

*Primary Examiner* — Daryl C Pope

(57) ABSTRACT

One general aspect includes a method to provide an alert to a vehicle occupant, the method includes: detecting, via an internal camera, whether the vehicle occupant is paying attention to an environment surrounding the vehicle; detecting, via an external camera, an occurrence of an event in the environment surrounding the vehicle; and based on each of the preceding steps, providing a notification configured to alert the vehicle occupant to transition the vehicle from a stopped state to a moving state.

20 Claims, 5 Drawing Sheets

SYSTEM AND METHOD TO ALERT A VEHICLE OCCUPANT TO RECOMMENCE VEHICLE OPERATIONS

INTRODUCTION

With the many distractions provided in today's world, it is easy for drivers to get sidetracked and stop paying attention to low-stress driving conditions. This can, for example, happen when a driver is stopped at a traffic light but loses focus and starts day dreaming or staring at their surroundings and not the situation at hand. This situation can also be burdensome for those in vehicles stopped behind an absent minded driver, as they may be stuck waiting at the traffic light long after it turns green. It is therefore desirable to provide a system and method that alerts a driver to recommence operating their vehicle when it is detected that both the driver is not paying attention and traffic should begin to move again. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to provide an alert to a vehicle occupant, the method includes: detecting, via an internal camera, whether the vehicle occupant is paying attention to an environment surrounding the vehicle; detecting, via an external camera, an occurrence of an event in the environment surrounding the vehicle; and based on each of the preceding steps, providing a notification configured to alert the vehicle occupant to transition the vehicle from a stopped state to a moving state. Other embodiments of this aspect include corresponding computer systems, apparatus, and computer programs recorded on one or more computer storage devices, each configured to perform the actions of the methods.

Implementations may include one or more of the following features. The method where the stopped state of the vehicle is created by an application of a brake to prevent vehicle movement and the moving state of the vehicle is created by removing the application of the brake. The method where the event is a traffic light transitioning from a red light state to a green light state. The method where the event is a third-party vehicle, located in front of the vehicle, transitioning from a stopped state to a moving state. The method where the internal camera is part of a driver monitoring system and facial recognition software is deployed to detect whether the vehicle occupant is paying attention. The method where the notification is a tactile notification provided through an activation of a piezoelectric device. The method further including the step of, after the notification has been provided, transitioning an engine of the vehicle from an inactive state to an active state. Implementations of the described techniques may include hardware, a method or process, or computer software on a computer-accessible medium.

One general aspect includes a system to provide an alert to a vehicle occupant, the system includes: a memory configured to include a plurality of executable instructions and a processor configured to execute the executable instructions, where the executable instructions enable the processor to carry out the following steps: detecting, via an internal camera, whether the vehicle occupant is paying attention to an environment surrounding the vehicle; detecting, via an external camera, an occurrence of an event in the environment surrounding the vehicle; and based on each of the preceding steps, providing a notification configured to alert the vehicle occupant to transition the vehicle from a stopped state to a moving state. Other embodiments of this aspect include corresponding computer systems, apparatus, and computer programs recorded on one or more computer storage devices, each configured to perform the actions of the methods.

Implementations may include one or more of the following features. The system where the stopped state of the vehicle is created by an application of a brake to prevent vehicle movement and the moving state of the vehicle is created by removing the application of the brake. The system where the event is a traffic light transitioning from a red light state to a green light state. The system where the event is a third-party vehicle, located in front of the vehicle, transitioning from a stopped state to a moving state. The system where the internal camera is part of a driver monitoring system and facial recognition software is deployed to detect whether the vehicle occupant is paying attention. The system where the notification is a tactile notification provided through an activation of a piezoelectric device. The system further including the step of, after the notification has been provided, transitioning an engine of the vehicle from an inactive state to an active state. Implementations of the described techniques may include hardware, a method or process, or computer software on a computer-accessible medium.

One general aspect includes a non-transitory and machine-readable medium having stored thereon executable instructions adapted to provide an alert to a vehicle occupant, which when provided to a processor and executed thereby, causes the processor to carry out the following steps: detecting, via an internal camera, whether the vehicle occupant is paying attention to an environment surrounding the vehicle; detecting, via an external camera, an occurrence of an event in the environment surrounding the vehicle; and based on each of the preceding steps, providing a notification configured to alert the vehicle occupant to transition the vehicle from a stopped state to a moving state. Other embodiments of this aspect include corresponding computer systems, apparatus, and computer programs recorded on one or more computer storage devices, each configured to perform the actions of the methods.

Implementations may include one or more of the following features. The non-transitory and machine-readable medium where the stopped state of the vehicle is created by an application of a brake to prevent vehicle movement and the moving state of the vehicle is created by removing the application of the brake. The non-transitory and machine-readable medium where the event is a traffic light transitioning from a red light state to a green light state. The non-transitory and machine-readable medium where the event is a third-party vehicle, located in front of the vehicle, transitioning from a stopped state to a moving state. The non-transitory and machine-readable medium where the internal camera is part of a driver monitoring system and facial recognition software is deployed to detect whether the vehicle occupant is paying attention. The non-transitory and machine-readable medium where the notification is a tactile notification provided through an activation of a piezoelectric device. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
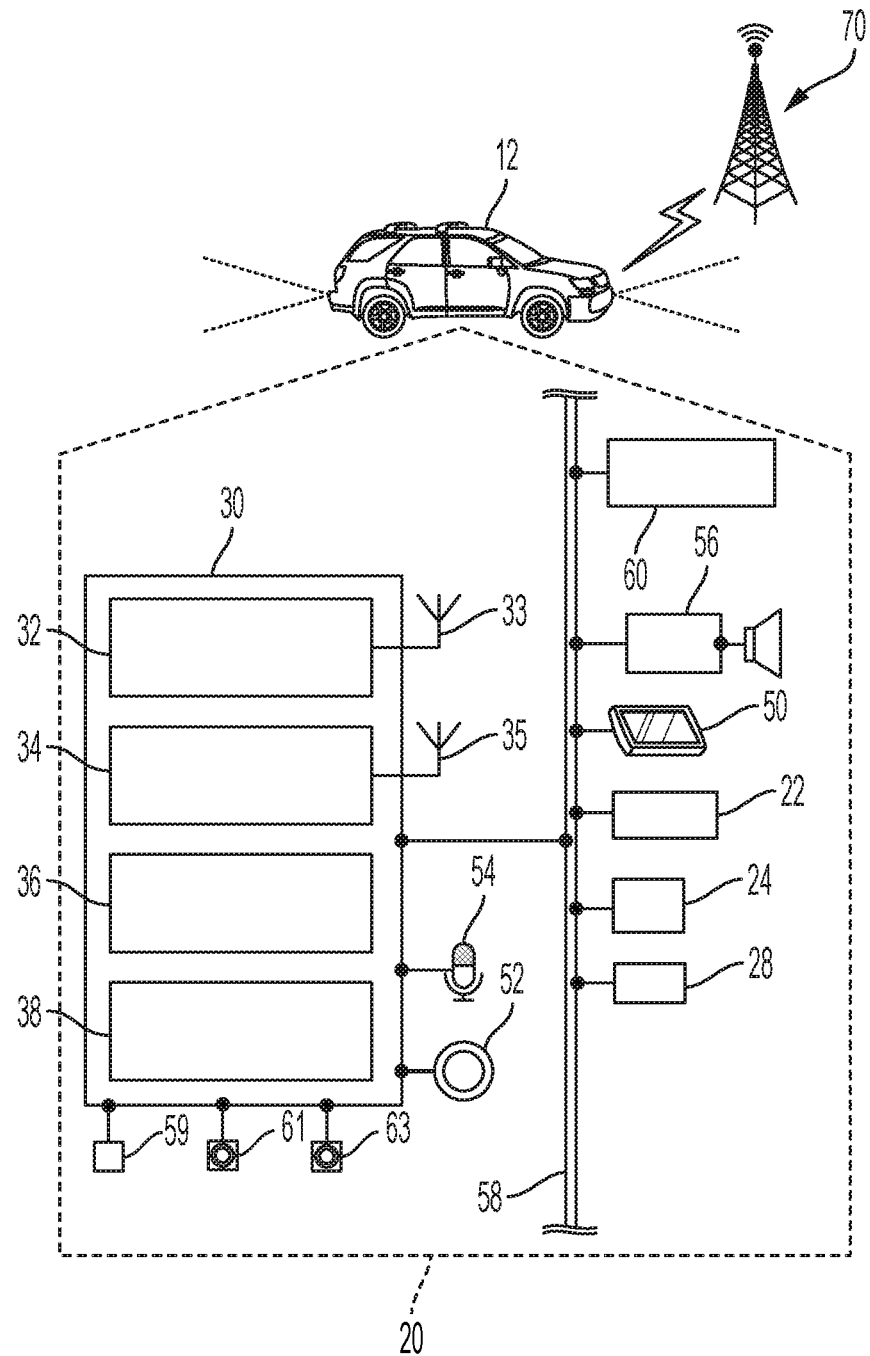
FIG. 1 is a block diagram depicting an exemplary embodiment of an electronics system capable of utilizing the system and method disclosed herein.

With reference to FIG. 1, vehicle 12 is depicted in the illustrated embodiment as a sports utility vehicle (SUV), but it should be appreciated that any other vehicle including motorcycles, trucks, passenger sedan, recreational vehicles (RVs), marine vessels, aircraft including unmanned aerial vehicles (UAVs), etc., can also be used. In certain embodiments, vehicle 12 may include a power train system with multiple generally known torque-generating devices including, for example, an engine. The engine may be an internal combustion engine that uses one or more cylinders to combust fuel, such as gasoline, in order to propel vehicle 12. The power train system may alternatively include numerous electric motors or traction motors that convert electrical energy into mechanical energy for propulsion of vehicle 12. The power train system may also be a start-stop system that will cause the engine to automatically transition to an inactive state when the vehicle is stopped so as to reduce the amount of idling time and thus to reduce fuel consumption and emissions.

Some of the vehicle electronics 20 are shown generally, in FIG. 1 and includes a global navigation satellite system (GNSS) receiver 22, a body control module or unit (BCM) 24, and other vehicle system modules (VSMs) 28, a telematics unit 30, vehicle-user interfaces 50-58, and onboard computer 60. Some or all of the different vehicle electronics may be connected for communication with each other via one or more communication busses, such as communications bus 58. The communications bus 58 provides the vehicle electronics with network connections using one or more network protocols and can use a serial data communication architecture. Examples of suitable network connections include a controller area network (CAN), a media-oriented system transfer (MOST), a local interconnection network (LIN), a local area network (LAN), and other appropriate connections such as Ethernet or others that conform with known ISO, SAE, and IEEE standards and specifications, to name but a few. In other embodiments, a wireless communications network that uses short-range wireless communications (SRWC) to communicate with one or more VSMs of the vehicle can be used. In one embodiment, the vehicle 12 can use a combination of a hardwired communications bus 58 and SRWCs. The SRWCs can be carried out using the telematics unit 30, for example.

The vehicle 12 can include numerous vehicle system modules (VSMs) as part of vehicle electronics 20, such as the GNSS receiver 22, BCM 24, telematics unit 30 (vehicle communications system), vehicle-user interfaces 50-56, and onboard computer 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is hardwire connected by communications bus 58 to the other VSMs including the telematics unit 30. Moreover, each of the VSMs can include and/or be communicatively coupled to suitable hardware that enables intra-vehicle communications to be carried out over the communications bus 58; such hardware can include, for example, bus interface connectors and/or modems. One or more VSMs 28 may periodically or occasionally have their software or firmware updated and, in some embodiments, such vehicle updates may be over the air (OTA) updates that are received from a remote computer or facility via a land network (not shown) and telematics unit 30. As is appreciated by those skilled in the art, the above-mentioned VSMs are only examples of some of the modules that may be used in vehicle 12, as numerous others are also possible. It should also be appreciated that these VSMs can otherwise be known as electronic control units, or ECUs.

Global navigation satellite system (GNSS) receiver 22 receives radio signals from a constellation of GNSS satellites (not shown). The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites (not shown). And, in another example, GNSS receiver 22 can be a BDS receiver that receives a plurality of GNSS (or BDS) signals from a constellation of GNSS (or BDS) satellites. The GNSS received can determine a current vehicle location based on reception of a plurality of GNSS signals from the constellation of GNSS satellites. The vehicle location information can then be communicated to the telematics unit 30, or other VSMs, such as the onboard computer 60. In one embodiment (as shown in FIG. 1), the telematics unit 30 and/or a telematics unit can be integrated with the GNSS receiver 22 so that, for example, the GNSS receiver 22 and the telematics unit 30 (or the wireless communications device) are directly connected to one another as opposed to being connected via communications bus 58. In other embodiments, the GNSS receiver 22 is a separate, standalone module or there may be a GNSS receiver 22 integrated into the telematics unit 30 in addition to a separate, standalone GNSS receiver connected to telematics unit 30 via communications bus 58.

Body control module (BCM) 24 can be used to control various VSMs 28 of the vehicle, as well as obtain information concerning the VSMs, including their present state or status, as well as sensor information. The BCM 24 is shown in the exemplary embodiment of FIG. 1 as being electrically coupled to the communication bus 58. In some embodiments, the BCM 24 may be integrated with or part of a center stack module (CSM) and/or integrated with telematics unit 30 or the onboard computer 60. Or, the BCM may be a separate device that is connected to other VSMs via bus 58. The BCM 24 can include a processor and/or memory, which can be similar to processor 36 and memory 38 of telematics unit 30, as discussed below. The BCM 24 may communicate with telematics unit 30 and/or one or more vehicle system modules, such as an engine control module (ECM), audio system 56, or other VSMs 28; in some embodiments, the BCM 24 can communicate with these modules via the communications bus 58. Software stored in the memory and executable by the processor enables the BCM 24 to direct one or more vehicle functions or operations including, for example, controlling central locking, controlling an electronic parking brake, power sun/moon roof, the vehicle's head lamps, air conditioning operations, power mirrors, controlling the vehicle primary mover (e.g., engine, primary propulsion system), and/or controlling various other vehicle system modules (VSMs).

Telematics unit 30 is capable of communicating data via SRWC through use of SRWC circuit 32 and/or via cellular network communications through use of a cellular chipset 34, as FIG. 1 depicted in the illustrated embodiment. The telematics unit 30 can provide an interface between various VSMs of the vehicle 12 and one or more devices external to the vehicle 12, such as one or more networks or systems at a remote call center (e.g., ON-STAR by GM). This enables the vehicle to communicate data or information with remote systems at a remote call center (not shown).

In at least one embodiment, the telematics unit 30 can also function as a central vehicle computer that can be used to carry out various vehicle tasks. In such embodiments, the telematics unit 30 can be integrated with the onboard computer 60 such that the onboard computer 60 and the telematics unit 30 are a single module. Or, the telematics unit 30 can be a separate central computer for the vehicle 12 in addition to the onboard computer 60. Also, the wireless communications device can be incorporated with or a part of other VSMs, such as a center stack module (CSM), body control module (BCM) 24, an infotainment module, a head unit, a telematics unit, and/or a gateway module. In some embodiments, the telematics unit 30 is a standalone module, and can be implemented as an OEM-installed (embedded) or aftermarket device that is installed in the vehicle.

In the illustrated embodiment, telematics unit 30 includes, the SRWC circuit 32, the cellular chipset 34, a processor 36, memory 38, SRWC antenna 33, and antenna 35. The telematics unit 30 can be configured to communicate wirelessly according to one or more SRWC protocols such as any of the Wi-Fi™, WiMAX™, Wi-Fi™ Direct, other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. And, in some embodiments, the telematics unit 30 can be configured to communicate using IEEE 802.11p such that the vehicle can carry out vehicle-to-vehicle (V2V) communications, or vehicle-to-infrastructure (V2I) communications with infrastructure systems or devices, such as at a remote call center. And, in other embodiments, other protocols can be used for V2V or V2I communications.

The SRWC circuitry 32 enables the telematics unit 30 to transmit and receive SRWC signals, such as BLE signals. The SRWC circuit can allow the telematics unit 30 to connect to another SRWC device (e.g., a smart phone). Additionally, in some embodiments, the telematics unit 30 contains a cellular chipset 34 thereby allowing the device to communicate via one or more cellular protocols, such as those used by cellular carrier system 70, through antenna 35. In such a case, the telematics unit 30 is user equipment (UE) that can be used to in carry out cellular communications via cellular carrier system 70.

Antenna 35 is used for communications and is generally known to be located throughout vehicle 12 at one or more locations external to the telematics unit 30. Using antenna 35, telematics unit 30 may enable the vehicle 12 to be in communication with one or more local or remote networks (e.g., one or more networks at a remote call center or server) via packet-switched data communication. This packet switched data communication may be carried out through use of a non-vehicle wireless access point or cellular system that is connected to a land network via a router or modem. When used for packet-switched data communication such as TCP/IP, the communications device 30 can be configured with a static Internet Protocol (IP) address or can be set up to automatically receive an assigned IP address from another device on the network such as a router or from a network address server.

Packet-switched data communications may also be carried out via use of a cellular network that may be accessible by the telematics unit 30. Communications device 30 may, via cellular chipset 34, communicate data over wireless carrier system 70. In such a scenario, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the telematics unit 30 to provide a wide variety of services. For instance, in one embodiment, the processor 36 can execute programs or process data to carry out at least a part of the method discussed herein. Memory 38 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. In one embodiment, the telematics unit 30 also includes a modem for communicating information over the communications bus 58.

Vehicle electronics 20 also includes a number of vehicle-user interfaces that provide vehicle occupants with a means of providing and/or receiving information, including visual display 50, pushbutton(s) 52, microphone 54, audio system 56, one or more piezoelectric devices 59, one or more external cameras 61, and internal camera 63. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, and/or control input. Audio system 56 provides audio output to a vehicle occupant and can be a dedicated, stand-alone system or part of the primary vehicle audio system. According to one embodiment, audio system 56 is operatively coupled to both vehicle bus 58 and an entertainment bus (not shown) and can provide AM, FM and satellite radio, CD, DVD, and other multimedia functionality. This functionality can be provided in conjunction with or independent of an infotainment module. Microphone 54 provides audio input to the telematics unit 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display 50 is preferably a touch-screen graphics display and can be used to provide a multitude of input and output functions. Display 50 can be a touch screen on the instrument panel, a heads-up display reflected off of the windshield, a video projector that projects images onto the windshield from the vehicle cabin ceiling, or some other display. For example, display 50 can be the touch screen of the vehicle's infotainment module at the center console of the vehicle's interior. Various other vehicle-user interfaces can also be utilized, as the interfaces of FIG. 1 are only an example of one particular implementation.

The one or more piezoelectric devices 59 can be installed in a vehicle seat or the steering wheel and are configured to vibrate to provide an alert notification for one or more vehicle occupants. For example, the piezoelectric devices 59 can be activated to tactically alert a vehicle operator 68 when vehicle 12 is unintentionally departing from the lane in which it is traveling or should be moving when it is currently stopped. The one or more external cameras 61 can be of the digital variety and can have a wide lens or ultra-wide lens variety to capture one or more images that are to be transmitted to telematics unit 30 and processor 36. The external camera (s) 61 can be part of a forward camera module (FCM) installed on the front bumper fascia of the vehicle 12 or at the externally facing side of the vehicle's rearview mirror or one of the sideview mirrors. The external camera(s) 61 can also be positioned to view the locations out front of the vehicle 12.

Figure 2:
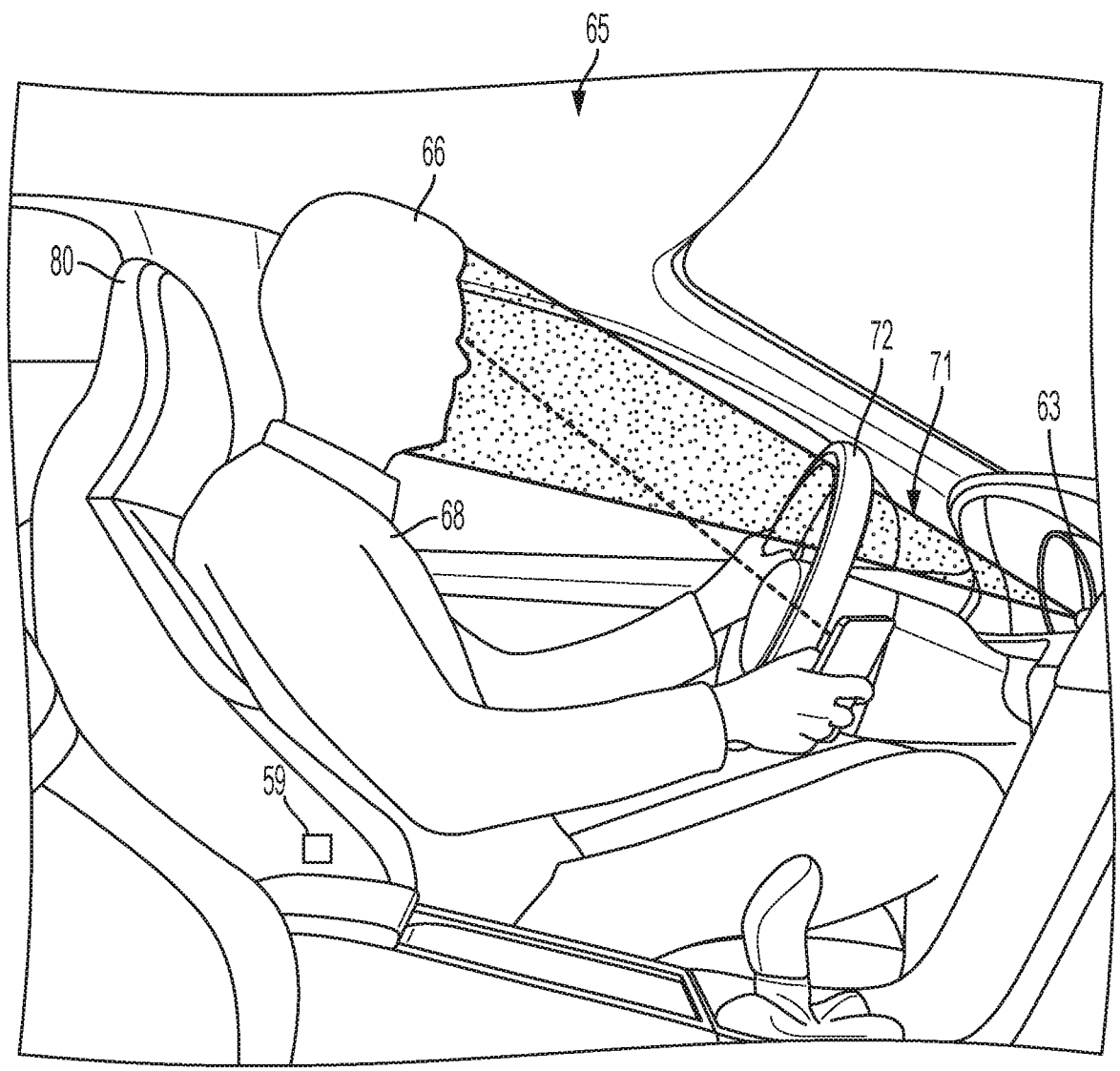
FIG. 2 depicts an exemplary aspect of the electronics system of FIG. 1.

Internal camera 63 can be of the digital variety and can have a wide lens or ultra-wide lens to capture one or more images that are to be transmitted to telematics unit 30 and processor 36. Camera 63 can be installed at any acceptable location to view the head position of the vehicle operator 68. For example, in one or more embodiments, the camera 63 can installed on the dashboard of the vehicle interior 65 (as shown), steering wheel 72 (or steering column), or rear-view mirror (not shown) and be part of a driver monitoring system 71. With reference to FIG. 2, DMS 71 (also known as a Driver Attention Monitor or DAM), is a vehicle safety system that implements internal camera(s) 63 as well as other infrared sensors to monitor the attentiveness of the vehicle operator. For example, as is generally known, the DMS 71 can deploy internal camera(s) 63 and infrared sensors to track the eye gaze of the driver (vehicle occupant 68) as well as position of the driver's head 66. This allows telematics unit 30 to deploy facial recognition software, via telematics unit 30, to monitor the eyelid positions of the driver to detect if they are paying attention to the vehicle's surroundings. If the vehicle operator does not seem to be paying attention to the road ahead (e.g., because they are looking at a smartphone screen, as shown) or seems to be getting drowsy, the DMS 71 can alert the driver by providing one or more notifications in the vehicle interior (e.g., visual notifications via display 50, audible notifications via audio system 56, or tactile notifications via the piezoelectric device(s) 59).

Method

Figure 3:
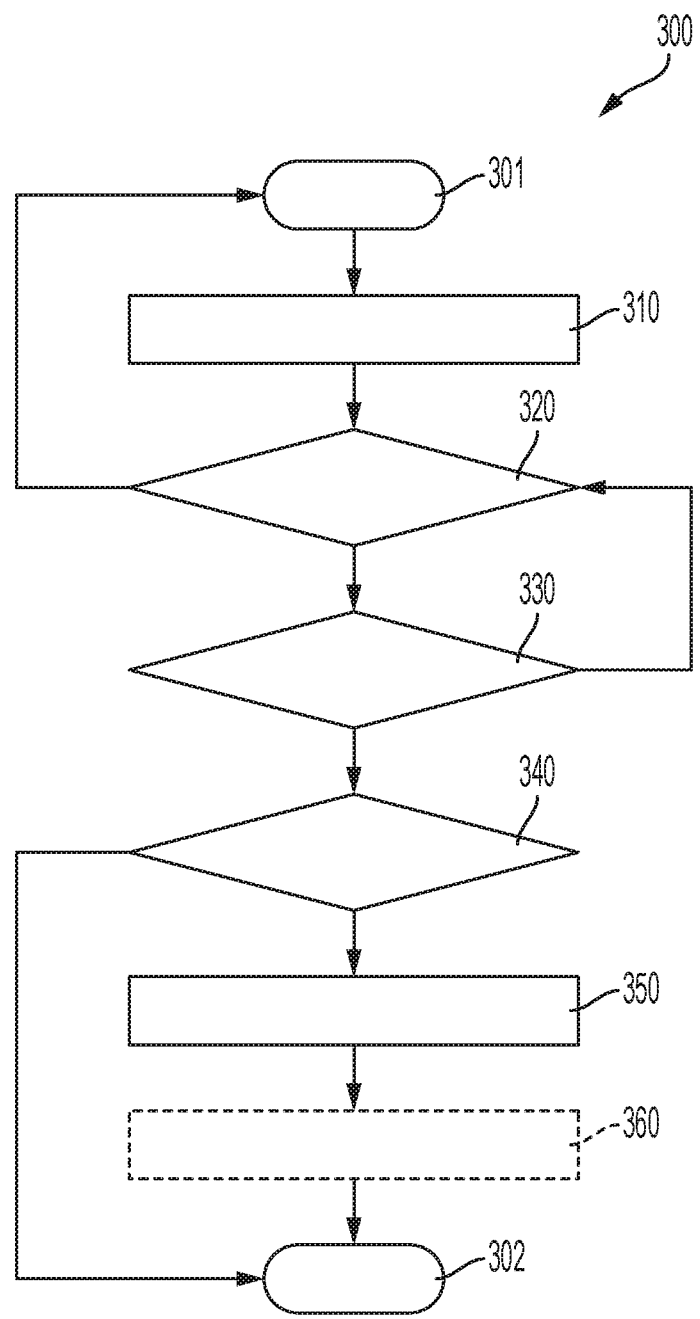
FIG. 3 is an exemplary flow chart for the utilization of exemplary system and method aspects disclosed herein.

Turning now to FIG. 3, there is shown an embodiment of a method 300 to detect (1) an instance of a vehicle driver not paying attention and (2) the vehicle being stopped at a traffic light (or in a traffic jam) and subsequently alert the vehicle driver to recommence vehicle operations when traffic begins to move again. One or more aspects of the alert method 300 may be carried out by telematics unit 30. For example, in order to carry out the one or more aspects of method 300, memory 38 includes executable instructions stored thereon and processor 36 executes these executable instructions. Skilled artists will see that one or more aspects of this alert method 300 can be carried out by an electronics control unit (ECU) of vehicle 12 (e.g., onboard computer 60) implementing a memory and processor to complete the method steps. One or more ancillary aspects of alert method 300 may also be completed by one or more vehicle devices such as, for example, external camera (s) 61, internal camera(s) 63, and the piezoelectric device(s) 59.

Method 300 begins at 301 in which the ignition of vehicle 12 is turned to the ON state and placed in the drive gear and the brake is fully being applied. In certain instances, for example, when the vehicle 12 includes a start-stop system, the engine may additionally have shut down on its own to reduce the amount of engine idling time (i.e., transition to an inactive state). Moreover, vehicle 12 can be situated at an intersection that includes a traffic light and/or one or more additional third-party vehicles temporarily stopped at a nearby location out front of the vehicle (e.g., these vehicles are also stopped at the traffic light or the vehicle 12 is stuck in a traffic jam). In step 310, the external camera(s) 61 will be activated to capture video feed of the environment surrounding at least the areas out front of vehicle 12. One or more radar devices, which can be installed in the vehicle bumper fascia, can also be activated to attain the relative locations of objects in this forward-facing vehicle environment. A backup camera (not shown), installed on the backside of vehicle, can also be activated to capture at least one image or video feed of the environment behind the vehicle 12, for example, to attain images of third-party vehicles stopped behind vehicle 12.

Figure 4:
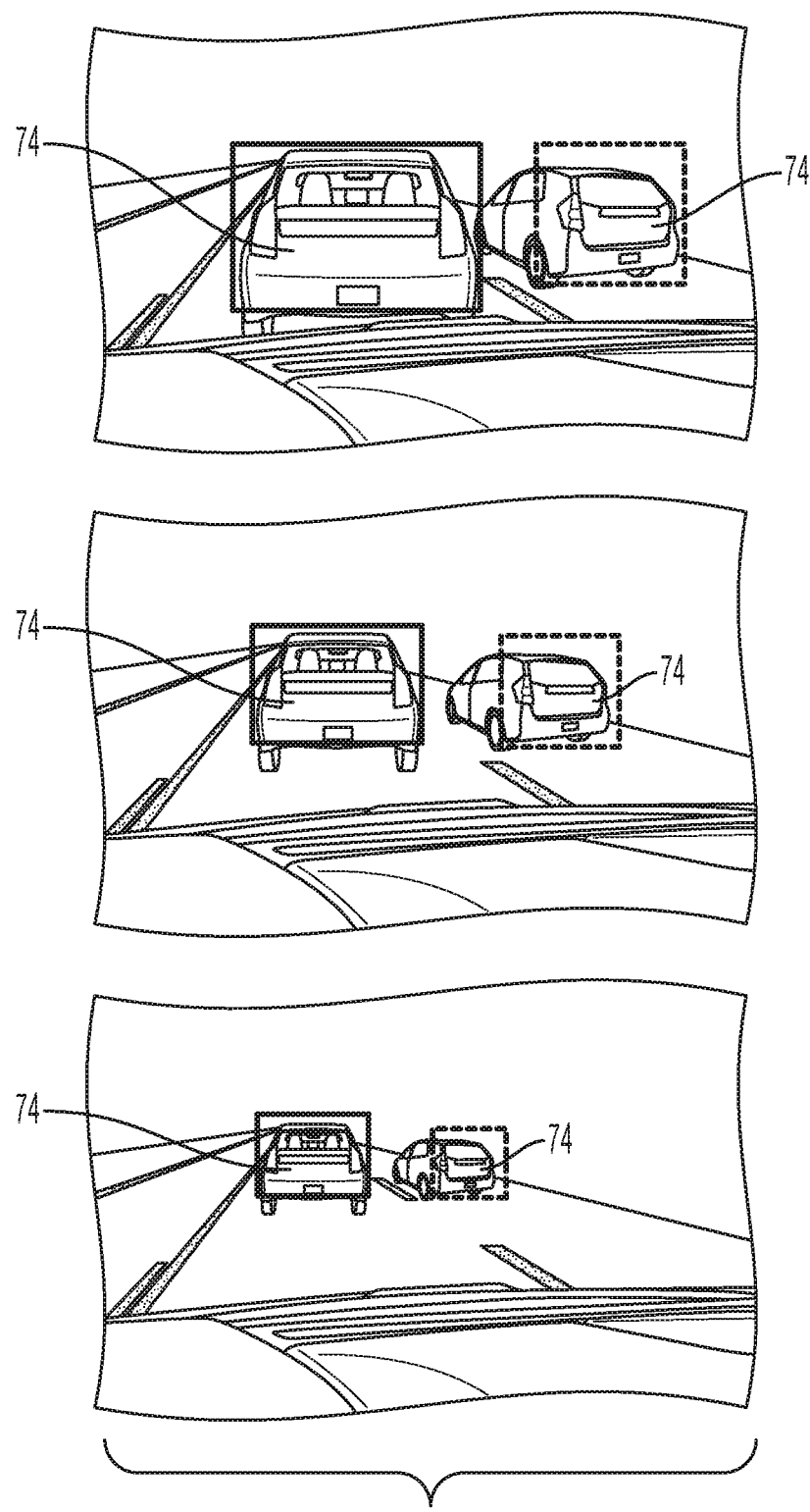
FIG. 4 is an illustrative aspect of the process flow of FIGS. 2.
Figure 5:
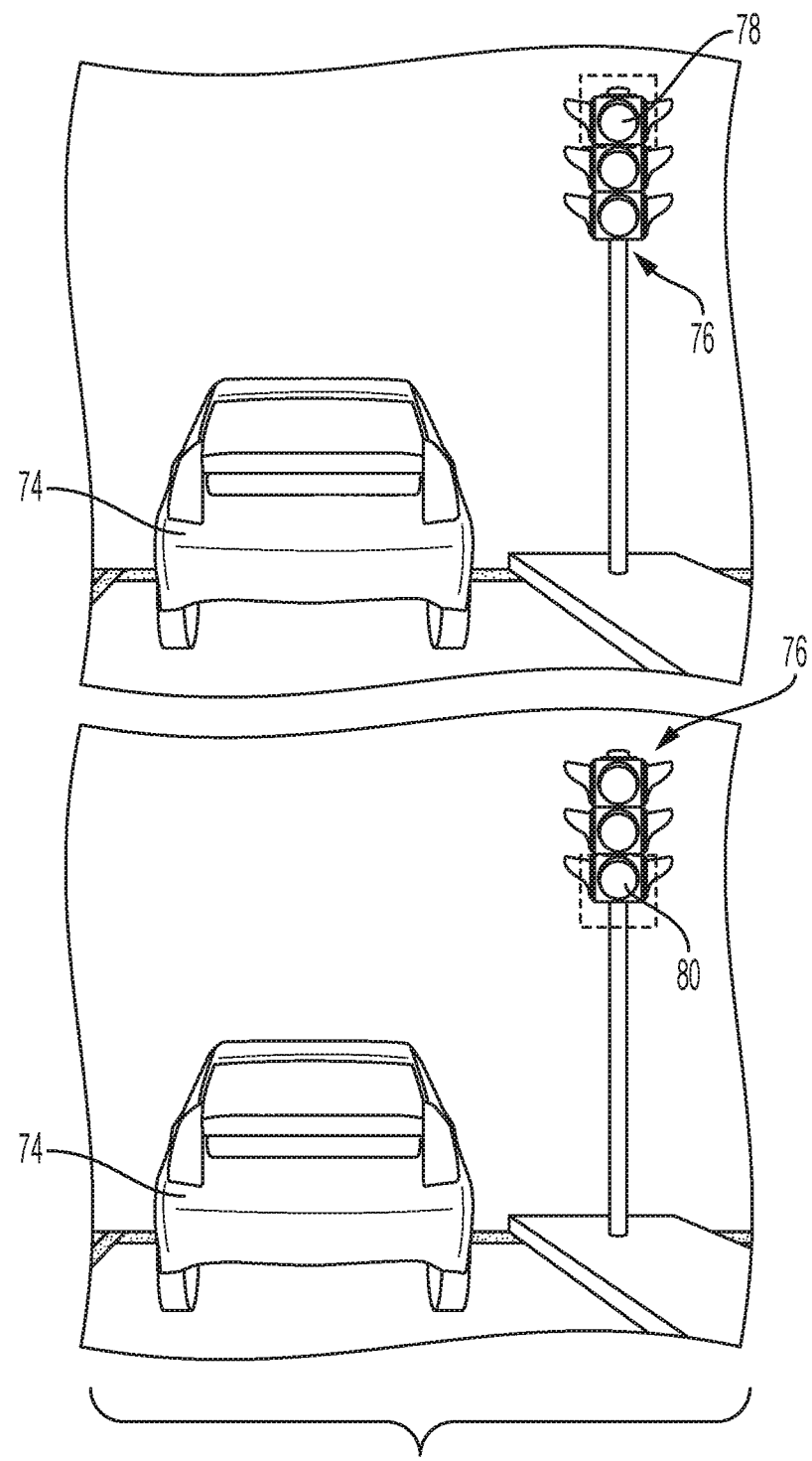
FIG. 5 is another illustrative aspect of the process flow of FIG. 2.

In step 320, the image(s)/video feed of the external camera(s) 61 will be processed and it will be determined if vehicle 12 is stuck in traffic (see FIG. 4) or stopped at a traffic light (see FIG. 5). If the image(s)/video feed disclose that the vehicle 12 is neither in a traffic jam nor at a traffic light, then method 300 will return to the beginning 301; otherwise, it will move to step 330. In certain instances, for example, when the backup camera is additionally activated, video feed from this camera will be processed to detect whether one or more third-party vehicles is/are stopped behind vehicle 12. As follows, if no additional vehicles are stuck behind vehicle 12, then method 300 may simply return to the beginning 301 regardless of whether traffic is moving again or a traffic light signals the vehicle 12 to begin moving again (i.e., because vehicle 12 is not being a burden to any bystanders).

In step 330, the video feed will be analyzed to detect whether an event has occurred in the environment surrounding vehicle 12. As such, it will be determined whether any third-party vehicles have begun to move forward because traffic has started to lighten up and/or whether a traffic light has signaled for traffic to recommence movement. Moreover, with further reference to FIG. 4, when it is determined that the surrounding third party vehicles have transitioned into a moving state, for example, because object recognition techniques recognize that the third-party vehicles are moving forward and away from the vehicle's present location, method 300 will move to step 340. As follows, when it is sensed that the third-party vehicles 74 have begun to shrink and the distance between the vehicle's present location and third-party vehicles 74 has begun to grow, it will be recognized that traffic has let up and the third-party vehicles are moving forward and away from the vehicle's present location. Otherwise, method 300 will return to step 320. Alternatively, or additionally, with further reference to FIG. 5, the video feed will be analyzed to determine whether the traffic light 76 has transitioned from a red light state to a green light state. For example, because object recognition techniques recognize that the red light 78 is no longer illuminated and that a green light 80, at a different location on the body of traffic light 76, has begun to illuminate, method 300 will move to step 340. Otherwise, method 300 will return to step 320.

In step 340, the internal camera(s) 63 will be activated to capture video feed of the head position 66 and/or face position of vehicle operator 68. Moreover, facial recognition techniques will be deployed to detect whether vehicle operator 68 is properly paying attention to the environment out front of vehicle 12 (as discussed above). When it is determined that the vehicle operator 68 is paying attention to the road/scene presently out front of them, method 300 will move to completion 302. Otherwise, method 300 will move to step 350. In step 350, a notification will be provided to the vehicle occupant 68 so as to alert them to transition vehicle 12 from a stopped state (i.e., due to their foot being on the brake) and to a moving state (i.e., alerting the driver to take their foot off the brake). The notification can, for example, be provided by activating the piezoelectric devices 59 to tactically alert the vehicle operator 68 (to begin paying attention to the road and to remove their foot from the brake to allow the vehicle to begin moving again). In one or more embodiments, the notification can be audible or visual in nature or the notification can be supported by an additional audible or visual alert. For example, the notification could be a chime sound produced by audio system 56 or it could be a text message produced on display 50, stating "PLEASE MOVE YOUR VEHICLE FORWARD" or the like. In optional step 360, when vehicle 12 includes a start-stop system, the engine will additionally turn itself back on (i.e., it will transition back to an active state). After step 360, method 300 will move to completion 302.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method to provide an alert to a vehicle occupant, the method comprises:
   detecting, via an internal camera, whether the vehicle occupant is paying attention to an environment in front of a vehicle;
   detecting, via a first external camera, whether an event in the environment in front of the vehicle has occurred;
   detecting, via a second external camera, whether one or more third-party vehicles are stopped behind the vehicle;
   when the vehicle operator is not paying attention to the environment in front of the vehicle and an event in the environment in front of the vehicle has occurred and one or more third-party vehicles are stopped behind the vehicle, providing a notification configured to alert the vehicle occupant to transition the vehicle from a stopped state to a moving state.

2. The method of claim 1, wherein the stopped state of the vehicle is created by an application of a brake to prevent vehicle movement and the moving state of the vehicle is created by removing the application of the brake.

3. The method of claim 1, wherein the event is a traffic light transitioning from a red light state to a green light state.

4. The method of claim 1, wherein the event is a third-party vehicle, located in front of the vehicle, transitioning from a stopped state to a moving state.

5. The method of claim 1, wherein the internal camera is part of a driver monitoring system and facial recognition software is deployed to detect whether the vehicle occupant is paying attention.

6. The method of claim 1, wherein the notification is a tactile notification provided through an activation of a piezoelectric device.

7. The method of claim 1, further comprising the step of, after the notification has been provided, transitioning an engine of the vehicle from an inactive state to an active state.

8. A system to provide an alert to a vehicle occupant, the system comprises:
   a memory configured to comprise a plurality of executable instructions and a processor configured to execute the executable instructions, wherein the executable instructions enable the processor to:
   detect, via an internal camera, whether the vehicle occupant is paying attention to an environment in front of the vehicle;
   detect, via a first external camera, whether an event in the environment in front of the vehicle has occurred;
   detect, via a second external camera, whether one or more third-party vehicles are stopped behind the vehicle;
   when the vehicle operator is not paying attention to the environment in front of the vehicle and an event in the environment in front of the vehicle has occurred and one or more third-party vehicles are stopped behind the vehicle, provide a notification configured to alert the vehicle occupant to transition the vehicle from a stopped state to a moving state.

9. The system of claim 8, wherein the stopped state of the vehicle is created by an application of a brake to prevent vehicle movement and the moving state of the vehicle is created by removing the application of the brake.

10. The system of claim 8, wherein the event is a traffic light transitioning from a red light state to a green light state.

11. The system of claim 8, wherein the event is a third-party vehicle, located in front of the vehicle, transitioning from a stopped state to a moving state.

12. The system of claim 8, wherein the internal camera is part of a driver monitoring system and facial recognition software is deployed to detect whether the vehicle occupant is paying attention.

13. The system of claim 8, wherein the notification is a tactile notification provided through an activation of a piezoelectric device.

14. The system of claim 8, further comprising the step of, after the notification has been provided, transitioning an engine of the vehicle from an inactive state to an active state.

15. A non-transitory and machine-readable medium having stored thereon executable instructions adapted to provide an alert to a vehicle occupant, which when provided to a processor and executed thereby, causes the processor to:
   detect, via an internal camera, whether the vehicle occupant is paying attention to an environment in front of the vehicle;
   detect, via a first external camera, whether an event in the environment in front of the vehicle has occurred;
   detect, via a second external camera, whether one or more third-party vehicles are stopped behind the vehicle;
   when the vehicle operator is not paying attention to the environment in front of the vehicle and an event in the environment in front of the vehicle has occurred and one or more third-party vehicles are stopped behind the vehicle, provide a notification configured to alert the vehicle occupant to transition the vehicle from a stopped state to a moving state.

16. The non-transitory and machine-readable medium of claim 15, wherein the stopped state of the vehicle is created by an application of a brake to prevent vehicle movement and the moving state of the vehicle is created by removing the application of the brake.

17. The non-transitory and machine-readable medium of claim 15, wherein the event is a traffic light transitioning from a red light state to a green light state.

18. The non-transitory and machine-readable medium of claim 15, wherein the event is a third-party vehicle, located in front of the vehicle, transitioning from a stopped state to a moving state.

19. The non-transitory and machine-readable medium of claim 15, wherein the internal camera is part of a driver monitoring system and facial recognition software is deployed to detect whether the vehicle occupant is paying attention.

20. The non-transitory and machine-readable medium of claim 15, wherein the notification is a tactile notification provided through an activation of a piezoelectric device.

* * * * *